United States Patent
Knoll et al.

(10) Patent No.: US 11,591,013 B2
(45) Date of Patent: Feb. 28, 2023

(54) METHOD FOR MOUNTING OF AN INTEGRAL STRUCTURAL UNIT IN AN ELECTROMECHANICAL MOTOR VEHICLE STEERING SYSTEM HAVING A TORQUE SENSOR UNIT AND A STEERING ANGLE SENSOR UNIT BY MEANS OF ULTRASONIC WELDING

(71) Applicants: thyssenkrupp Presta AG, Eschen (LI); thyssenkrupp AG, Essen (DE)

(72) Inventors: Peter Knoll, Lindau (DE); Manuel Knecht, Bodnegg (DE)

(73) Assignees: THYSSENKRUPP PRESTA AG, Eschen (LI); THYSSENKRUPP AG, Essen (DE)

( * ) Notice: Subject to any disclaimer, the term of this patent is extended or adjusted under 35 U.S.C. 154(b) by 454 days.

(21) Appl. No.: 16/634,034

(22) PCT Filed: Aug. 1, 2018

(86) PCT No.: PCT/EP2018/070827
§ 371 (c)(1),
(2) Date: Jan. 24, 2020

(87) PCT Pub. No.: WO2019/025476
PCT Pub. Date: Feb. 7, 2019

(65) Prior Publication Data
US 2021/0086829 A1 Mar. 25, 2021

(30) Foreign Application Priority Data
Aug. 4, 2017 (DE) ...................... 10 2017 117 716.7

(51) Int. Cl.
*B62D 6/10* (2006.01)
*G01L 3/10* (2006.01)
(Continued)

(52) U.S. Cl.
CPC ................ *B62D 6/10* (2013.01); *G01L 3/104* (2013.01); *G01L 5/221* (2013.01); *B62D 5/0421* (2013.01);
(Continued)

(58) Field of Classification Search
CPC ......... B62D 6/10; B62D 5/0421; G01L 3/104; G01L 5/221; F16C 2326/24; F16D 2066/005
(Continued)

(56) References Cited

U.S. PATENT DOCUMENTS

| | | | |
|---|---|---|---|
| 2015/0211947 A1* | 7/2015 | Yoshida | ................. G01L 3/101 73/862.325 |
| 2015/0276524 A1 | 10/2015 | Schoepe et al. | |

(Continued)

FOREIGN PATENT DOCUMENTS

| | | |
|---|---|---|
| CN | 104854435 A | 8/2015 |
| CN | 104870958 A | 8/2015 |

(Continued)

OTHER PUBLICATIONS

English Translation of International Search Report issued in PCT/EP2018/070827, dated Nov. 8, 2018.

*Primary Examiner* — Octavia Davis Hollington
(74) *Attorney, Agent, or Firm* — thyssenkrupp North America, LLC (57) ABSTRACT

An electromechanical power steering unit for a motor vehicle includes an integral component having a torque sensor unit, which detects the rotation of the upper steering shaft relative to the lower steering shaft. The torque sensor unit includes a ring magnet rotationally fixed to the upper steering shaft and a magnetic flux guide connected to the lower steering shaft. A magnet sensor detects the rotation of the shaft connected to the ring magnet with respect to the (Continued)

lower shaft connected to the magnetic flux guide and the ring magnet is carried by a ring magnet sleeve, which sits on the upper steering shaft and is made from a thermoplastic material and is molded by way of ultrasound forming in the upper steering shaft in one region for mounting on the upper steering shaft.

15 Claims, 4 Drawing Sheets

(51) Int. Cl.
*G01L 5/22* (2006.01)
*B62D 5/04* (2006.01)
*F16D 66/00* (2006.01)

(52) U.S. Cl.
CPC .... *F16C 2326/24* (2013.01); *F16D 2066/005* (2013.01)

(58) Field of Classification Search
USPC ........................ 73/862.331–862.338; 180/444
See application file for complete search history.

(56) References Cited

U.S. PATENT DOCUMENTS

| | | | |
|---|---|---|---|
| 2016/0016607 A1* | 1/2016 | Yoshida | ............... B62D 5/0421 324/207.2 |
| 2016/0083008 A1 | 3/2016 | Murakami | |
| 2016/0214648 A1 | 7/2016 | Schoepe et al. | |
| 2016/0379754 A1 | 12/2016 | Rachui et al. | |

FOREIGN PATENT DOCUMENTS

| | | |
|---|---|---|
| CN | 105849286 A | 8/2016 |
| DE | 10 2007 043 502 A | 4/2009 |
| DE | 10 2011 101 482 A | 11/2012 |
| DE | 10 2015 204 781 A | 3/2016 |
| DE | 10 2015 013 965 A | 5/2017 |
| EP | 1 918 175 A | 5/2008 |
| EP | 2 594 915 A | 5/2013 |
| KR | 2014 0145492 A | 12/2014 |

* cited by examiner

METHOD FOR MOUNTING OF AN INTEGRAL STRUCTURAL UNIT IN AN ELECTROMECHANICAL MOTOR VEHICLE STEERING SYSTEM HAVING A TORQUE SENSOR UNIT AND A STEERING ANGLE SENSOR UNIT BY MEANS OF ULTRASONIC WELDING

CROSS REFERENCE TO RELATED APPLICATIONS

This application is a U.S. National Stage Entry of International Patent Application Serial Number PCT/EP2018/070827, filed Aug. 1, 2018, which claims priority to German Patent Application No. DE 10 2017 117 716.7, filed Aug. 4, 2017, the entire contents of both of which are incorporated herein by reference.

FIELD

The present disclosure generally relates to an electromechanical power steering for a motor vehicle.

BACKGROUND

Electromechanical motor vehicle power steering comprises servo-units which can be arranged as a power assist mechanism on a pinion or a rack of the steering transmission. Usually the steering shafts in motor vehicles are divided into an upper steering shaft, which is connected to a control wheel or steering wheel, and a lower steering shaft, which is connected to the steering transmission for swiveling the wheels. The upper and lower steering shaft are joined together in rotationally elastic manner by a torsion bar. The rotation of the upper steering shaft relative to the lower steering shaft is used to measure the torque applied by a driver to the steering system, which is required in order to determine the steering assist.

The detecting of a relative moment between the upper steering shaft and the lower steering shaft is done by means of a torque sensor.

From the patent application DE 10 2011 101 482 A1 there is known a sensor assembly comprising an encoder fastened on a rotatable shaft and having an encoder element, where the encoder element is provided with a readable encoding for an associated sensor element and it is carried by a support sleeve. The support sleeve is made of a thermoplastic material, which is molded into a recess of the shaft by means of ultrasound forming. However, the ultrasound welding process has drawbacks in terms of the strength of the welded seams, especially because only slight pressing forces are presentable during the welding process.

A torque sensor is known for example from the document DE 10 2007 043 502 A1. The torque sensor mechanism is arranged on two opposite shaft pieces in the axial direction or the upper steering shaft and the lower steering shaft of the steering shaft, which are joined together by a torsion bar. On the upper steering shaft there is arranged a magnet—such as a ring magnet—while on the lower steering shaft there is arranged a holder with a magnetic stator, which is located opposite the permanent magnet by a small air gap in the radial direction. The magnetic flux of the magnet is conducted across the stator—which usually consists of two separate stator pieces—to a first and a second flux guide, which then relinquish the magnetic flux to a magnet sensor—such as a Hall sensor. The magnet sensor is located between the two flux guides.

Traditionally, the magnet is fastened at a mounting seat on the upper steering shaft by pressing into a sleeve integrated in a magnet holder by injection molding. However, the press fitting and the serration involved in this process are a problem, since the required low tolerances of the serration are hard to achieve in the injection molding process and furthermore the design is prone to cracks. Moreover, the production of the sleeve and the press fitting involve high costs.

Thus a need exists for a technical solution for a connection of a ring magnet or stator holder of a torque sensor to a shaft, which simplifies the manufacture and can prevent high stresses or cracks on the components.

DETAILED DESCRIPTION

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present invention relates to an electromechanical power steering assembly for a motor vehicle and a method for mounting an integral component in an electromechanical motor vehicle steering assembly.

Accordingly, it is proposed for an electromechanical power steering for a motor vehicle, comprising a steering shaft which is mounted able to rotate about a steering shaft axis of rotation and which comprises an upper steering shaft and a lower steering shaft, which are joined together by a torsion bar an integral component having a sensor unit, comprising a torque sensor unit, which detects the rotation of the upper steering shaft relative to the lower steering shaft, and/or a steering angle sensor unit, which measures the absolute steering angle of the lower steering shaft or the upper steering shaft with a spur gearing, wherein the sensor unit comprises a ring magnet rotationally fixed to the upper steering shaft or lower steering shaft, and wherein a magnetic sensor detects the rotation of the steering shaft connected to the ring magnet, and wherein the ring magnet is carried by a part in the shape of a ring magnet sleeve or a stator holder, the part being arranged on the upper steering shaft or the lower steering shaft, that the ring magnet sleeve and/or the stator holder is made from a thermoplastic material and is molded by means of ultrasound forming in the steering shaft in one region for mounting on the steering shaft.

Preferably, this involves an electromechanical power steering for a motor vehicle, comprising a steering shaft which is mounted able to rotate about a steering shaft axis of rotation and which comprises an upper steering shaft and a lower steering shaft, which are joined together by a torsion bar, an integral component having a torque sensor unit, which detects the rotation of the upper steering shaft relative to the lower steering shaft, and having a steering angle sensor unit, which measures the absolute steering angle of the lower steering shaft or the upper steering shaft with a spur gearing, wherein the torque sensor unit comprises a ring magnet rotationally fixed to the upper or lower steering shaft and a magnetic flux guide connected to the upper or lower steering shaft, and wherein a magnet sensor detects the rotation of the upper or lower steering shaft connected to the ring magnet with respect to the upper or lower steering shaft connected to the magnetic flux guide, and wherein the spur gearing comprises a first gear, which is connected to a stator holder, and wherein the ring magnet is carried by a ring magnet sleeve, which is arranged on the upper or lower steering shaft, and the ring magnet sleeve and/or the stator holder is made from a thermoplastic material and is molded by means of ultrasound forming in the upper or lower steering shaft in one region for mounting on the upper or lower steering shaft.

Instead of pressing the overmolded ring magnet sleeve onto the steering shaft as is traditionally required, this is joined directly to the sleeve by ultrasound countersinking. Owing to the ultrasound welding, large stresses in the coupling piece can be avoided by form fitting. It is conceivable and possible to form the ring magnet as a single piece or to form the ring magnet by the ring magnet sleeve.

Preferably, the upper steering shaft and/or the lower steering shaft comprises a knurling in a fastening region with the ring magnet sleeve and/or the stator holder. It is conceivable and possible for the ring magnet sleeve or an inner surface of the stator holder to have a knurling or toothing structure. Owing to a knurling both on the ring magnet sleeve and in the fastening region of the upper and/or lower steering shaft or owing to a knurling both on the inner surface of the stator holder and in the fastening region of the upper and/or lower steering shaft, a reliable form fitting of the connection between the plastic component and the metal element can be assured.

The knurling is executed for example as a cross knurling or lengthwise knurling, as a straight knurling or a transverse knurling, or as a diagonal knurling.

It is advantageous for the ring magnet sleeve to comprise protrusions on one end face, which are provided for the fastening of a tool, which secures the ring magnet sleeve in order to prevent a slippage during the sonic action. Preferably, the magnetic flux guide encloses or surrounds the ring magnet sleeve.

In one preferred embodiment, the spur gearing comprises a first gear, which surrounds the ring magnet at the circumference with an outwardly directed first toothing, and a second gear, which is mounted able to turn about a second gear axis, having an outwardly directed second toothing encircling the second gear axis, wherein the second gear axis is situated parallel to and spaced apart from the steering shaft axis of rotation and the first toothing and the second toothing are intermeshed with each other.

Preferably, the first gear with the outwardly directed first toothing is fashioned as a single piece with the stator holder. In this way, components can be economized and thus costs reduced.

Further, it is preferable for a third gear to be provided, which is mounted able to turn about a third gear axis, having an outwardly directed third toothing encircling the third gear axis, wherein the third gear axis is situated parallel to and spaced apart from the steering shaft axis of rotation and parallel to and spaced apart from the second gear axis.

For simple magnetic sensing of the angle of rotation, preferably a magnetic substrate is provided, which is joined rotationally fixed to the third gear or integrally forms the third gear, and its rotational position can be sensed by a sensor element. By the combination of the gears with each other, a gear transmission is presented, so that preferably the magnetic substrate or simply the magnet turns more slowly than the turning of the steering shaft to be detected. In particular, the substrate or the magnet will only rotate at most one time through 360°, even though the steering shaft executes multiple rotations, such as four rotations.

For the presentation of the gear transmission, especially for stepping down to a slower rotation, the third gear is preferably received partly in the second gear and mounted able to turn about the third gear axis.

For a simple presentation of an eccentric transmission, a fourth gear may be provided, comprising an inwardly directed fourth toothing encircling the second gear axis and third gear axis, and meshing with the third toothing.

In particular, the fourth toothing is advantageously situated stationary and nondisplaceable with respect to the steering shaft axis and the second gear axis and the third gear axis.

Furthermore, a method is provided for mounting an integral component in an electromechanical power steering for a motor vehicle, comprising a steering shaft which is mounted able to rotate about a steering shaft axis of rotation and which comprises an upper steering shaft and a lower steering shaft, which are joined together by a torsion bar, wherein the integral component has a sensor unit, comprising a torque sensor unit, which detects the rotation of the upper steering shaft relative to the lower steering shaft, and/or a steering angle sensor unit, which measures the absolute steering angle of the lower steering shaft or the upper steering shaft with a spur gearing, wherein the sensor unit comprises a ring magnet rotationally fixed to the upper steering shaft (3) or lower steering shaft, and wherein a magnetic sensor detects the rotation of the steering shaft connected to the ring magnet, and wherein the ring magnet is carried by a part in the shape of a ring magnet sleeve or a stator holder, the part being arranged on the upper steering shaft or the lower steering shaft, characterized by the following steps:

provide the ring magnet sleeve and/or the stator holder made of a thermoplastic material, positioning of the ring magnet sleeve and/or the stator holder on the upper steering shaft or the lower steering shaft with a defined contact pressure, introducing a high-frequency mechanical vibration in the ultrasound range into the corresponding steering shaft, pressing the corresponding steering shaft into the ring magnet sleeve and/or the stator holder with a defined contact pressure.

Furthermore, a method is provided for mounting an integral component in an electromechanical motor vehicle steering having a torque sensor unit, which detects the rotation of an upper steering shaft relative to a lower steering shaft, and a steering angle sensor unit, which measures an absolute steering angle of the lower steering shaft or the upper steering shaft with a spur gearing, wherein the torque sensor unit comprises a ring magnet rotationally fixed to the upper or lower steering shaft and a magnetic flux guide connected to the upper or lower steering shaft, and wherein a magnet sensor detects the rotation of the steering shaft connected to the ring magnet with respect to the steering shaft connected to the magnetic flux guide, and wherein the spur gearing comprises a first gear, which is connected to a stator holder, and wherein the ring magnet is carried by a ring magnet sleeve, characterized by the following steps:

providing the ring magnet sleeve and/or the stator holder made of a thermoplastic material, positioning of the ring magnet sleeve and/or the stator holder on the upper steering shaft or the lower steering shaft with a defined contact pressure, introducing a high-frequency mechanical vibration in the ultrasound range into the upper or lower steering shaft, pressing the upper steering shaft into the ring magnet sleeve and/or the stator holder with a defined contact pressure.

Preferably, the high-frequency mechanical vibration lies in a range of 10 kHz to 40 kHz, particularly preferably it is 20 kHz. In one preferred embodiment, the upper steering shaft and/or the lower steering shaft comprises a knurling on an outer side and the ring magnet sleeve plasticized by the high-frequency mechanical vibration flows around undercuts of the knurling, so that after the cooldown a form fitting and integrally bonded connection is produced between the ring magnet sleeve and the upper steering shaft or the lower steering shaft and/or between the stator holder and the upper steering shaft or the lower steering shaft.

Preferably, during the introducing of the high-frequency mechanical vibration in the ultrasound range into the steering shaft the latter is held in position with a holding clamp.

It is advantageous when the positioning of the ring magnet sleeve on the steering shaft is done by means of a tool which is placed on protrusions at the end face of the ring magnet sleeve.

In one embodiment, a sonotrode is placed on one of the end faces of the upper steering shaft or on one of the end faces of the lower steering shaft for the introducing of the high-frequency mechanical vibration.

FIGS. 1 to 5 show an electromechanical power steering 1 of a motor vehicle having an electric motor 2, which assists the steering movement of a driver on a steering column. For the assistance, a rotor of the electric motor is coupled by a transmission 6, in the example a worm gear transmission, into the rotation of the steering shaft 300. The steering shaft 300 comprises an upper steering shaft 3 and a lower steering shaft 4, which are joined together by a torsion bar 5 and mounted able to turn about a steering shaft axis 301. The upper and lower steering shaft may also be called the upper and lower shaft or the steering shaft. The upper steering shaft 3 is joined rotationally fixed directly to a steering wheel, not shown. The electric motor 2 drives the lower steering shaft 4 across a transmission 6, which is connected to a rack and pinion steering gear, not shown. The electric motor 2 comprises a rotor position sensor (RPS) 7. Furthermore, an integral component 8 is provided, having a torque sensor unit 9 and a steering angle sensor unit 10. The torque sensor unit 9 detects the rotation of the upper steering shaft 3 relative to the lower steering shaft 4 as a measure of the torque manually exerted on the upper steering shaft 3. The steering angle sensor unit 10, on the other hand, measures the current steering angle of the lower steering shaft 4.

The torque sensor unit 9 comprises a ring magnet 11 (permanent magnet) joined rotationally fixed to the upper steering shaft 3 and a magnetic flux guide 12. An associated sensor unit 13 is spatially fixed to the unit of the electric motor 2.

Figures 1, 2:
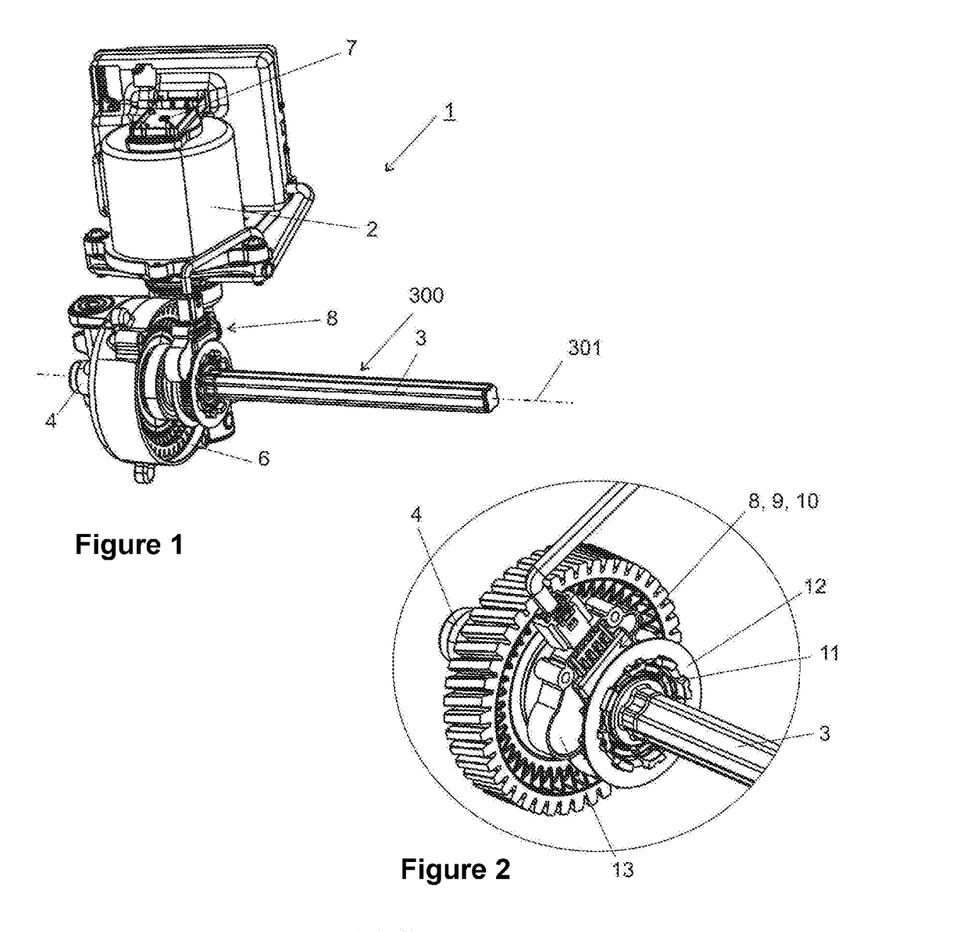
FIG. 1 is a perspective view of an electromechanical power steering having an electric motor, a torque sensor and a steering angle sensor.
FIG. 2 is a detailed view of the integral component of the torque sensor and the steering angle sensor.
Figure 3:
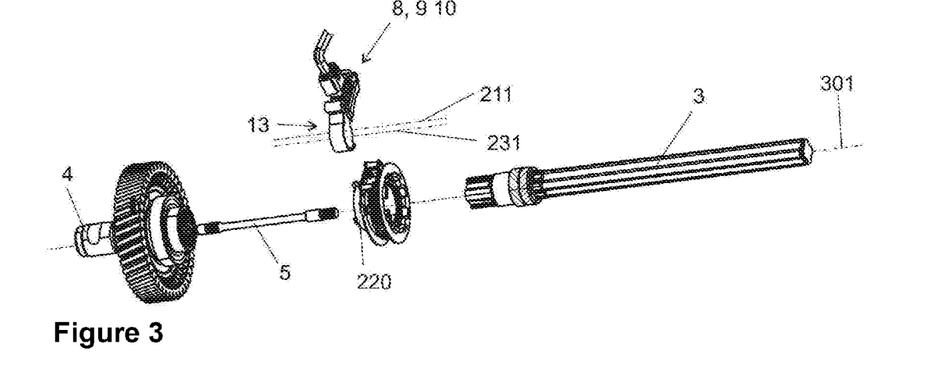
FIG. 3 is an exploded view of the arrangement of the integral component on the steering shaft.
Figure 4:
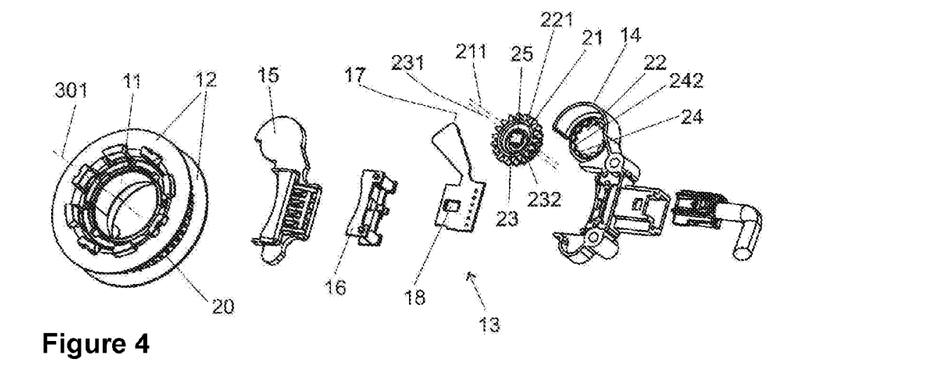
FIG. 4 is an exploded view of the integral component from a first side.
Figures 5, 6:
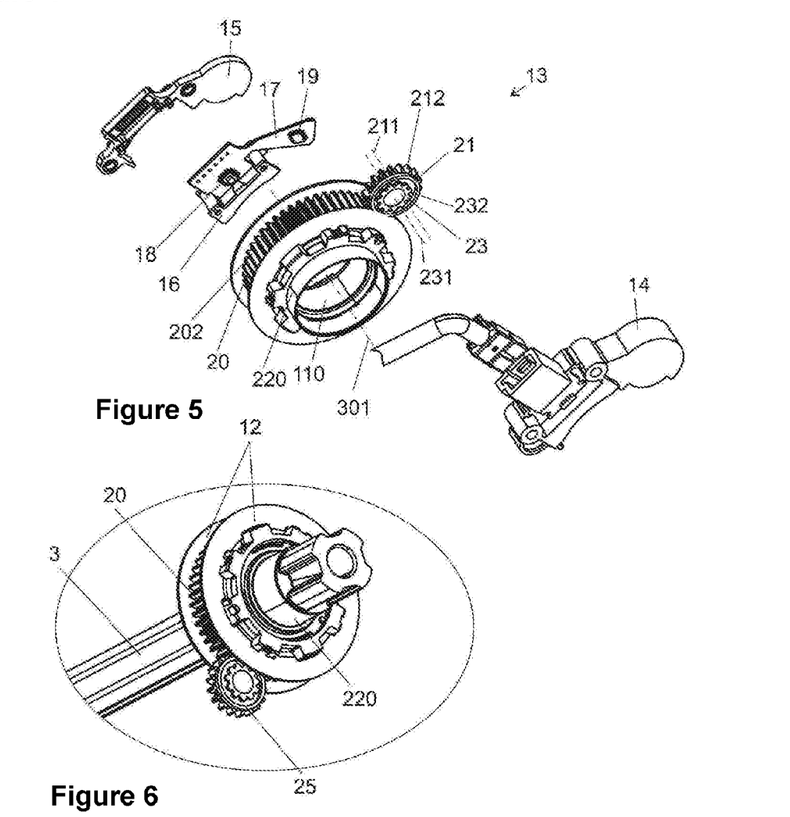
FIG. 5 is an exploded view of the integral component from a second side.
FIG. 6 is a detailed view of a magnetic flux guide of the integral component placed on the steering shaft.

FIGS. 4 and 5 show in detail the construction of the integral component 8. The sensor unit 13 comprises a housing 14 with a housing cover 15 and arranged therein a magnetic flux guide 16 and a magnet sensor 18 arranged on a circuit board 17. The flux guides 12, 16 serve for concentrating the magnetic flux on the magnet sensor 18.

The magnet sensor 18 detects the rotation of the upper shaft 3, connected to the ring magnet 11, relative to the lower shaft 4, connected to one of the magnetic flux guides 12.

Besides the magnet sensor 18 of the torque sensor unit 9, a sensor element 19 of the steering angle sensor unit 10 is also provided on the circuit board 17.

The ring magnet 11 is surrounded at the circumference by a first gear 20 having an outwardly directed first toothing 202, which is part of the steering angle sensor unit 10. This toothing is arranged concentric to the steering shaft axis 301. In this first toothing 202 of the first gear 20 there meshes a second encircling and outwardly directed toothing 212 of a second gear 21, which rolls off along the first gear 20 and is mounted in a pocket of the housing 14, able to rotate about a second gear axis 211. The second gear axis 211 is arranged parallel to and offset from the steering shaft axis 301. In the second gear 21, in turn, a third gear 23 able to turn about a third gear axis 231 is led eccentrically and rotatably. Accordingly, the third gear axis 231 is arranged parallel to and offset from the second gear axis 211 and the steering shaft axis 301. The third gear 23 comprises an encircling and outwardly directed third toothing 232. An inwardly directed encircling fourth toothing 242 of a fourth gear 24 is arranged in the pocket 22 of the housing 14 and meshes with the third toothing 232, so that this third toothing 232 rolls along this fourth toothing 242. The gears 20, 21, 23 form a spur gearing, all the axes of rotation 301, 201, 211, 231 being arranged parallel to and offset from one another.

The rotary movement of the upper steering shaft 3 is thus transmitted by the gearing to the third gear 23, in which a permanent magnet is arranged, formed by a magnetic substrate 25. The rotation of the third gear 23 is then detected with the aid of the sensor element 19 on the circuit board 17. Alternatively to the use of a separate permanent magnet, the magnetic substrate 25 may be integrated in the third gear 23 or may even form the entire third gear.

The steering angle sensor in this exemplary embodiment may unambiguously detect a region of four rotations of the steering shaft, especially the lower steering shaft 4. For this, a transmission ratio UF of 4:1 is provided from the first gear, that is, from the lower steering shaft 4, to the encoder gearing element. While the lower steering shaft 4 completes four rotations, the third gear of the encoder gearing element of the spur gearing rotates only one time. In the embodiment represented here, the transmission ratio is realized with a single tooth difference between the internal toothing of the pocket and the encoder gearing element. In this way, an absolute angle of rotation of the rotational position of the lower steering shaft 4 can be determined, even after multiple rotations of the lower steering shaft 4. Since the upper steering shaft 3 is connected to the lower steering shaft 4 by the rotary elastic torsion bar 5 and only slight angles of rotation between the two steering shafts 3, 4 relative to each other are permitted, the rotary position of the upper steering shaft 3 is also virtually determined in this way.

The ring magnet 11 is carried by a support sleeve 110, the ring magnet sleeve. By injection molding, the ring magnet 11 is overmolded and the magnet holder or the ring magnet sleeve 110 is produced. The ring magnet sleeve 110 is made from thermoplastic material and can be formed for the installation by means of ultrasound forming so that it is secured permanently and free of play on a fastening region of the steering shaft in the axial direction and in the circumferential direction.

FIG. 6 shows the arrangement of the magnetic flux guide 12 on the steering shaft 3 without the ring magnet 11.

Figure 7:
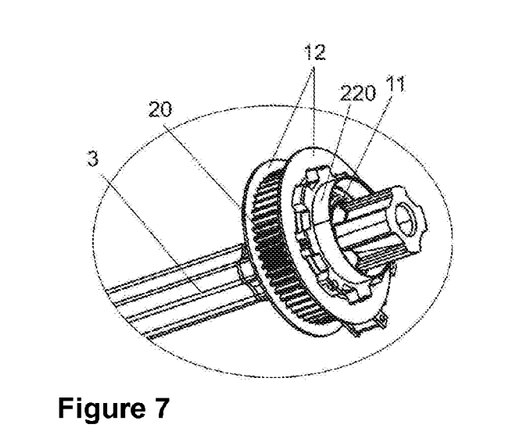
FIG. 7 is a detailed view of the magnetic flux guide and a ring magnet sleeve secured on the steering shaft.

FIG. 7 shows the placement of the ring magnet sleeve 110 on the upper steering shaft 3. The magnetic flux guide 12 surrounds the ring magnet sleeve 110 on its side facing away from the outwardly directed first toothing 202 or encloses the ring magnet sleeve 110. The ring magnet 11 and the ring magnet sleeve 110 are basically rotationally symmetrical to a center axis.

Figure 8:
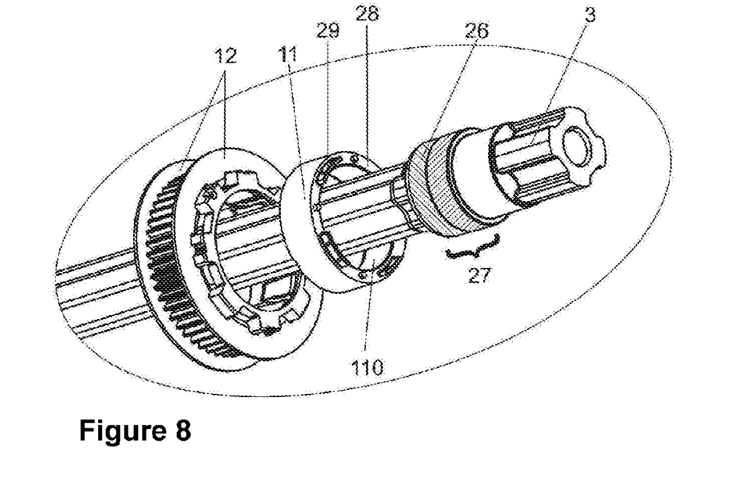
FIG. 8 is an exploded view of the arrangement with magnetic flux guide, ring magnet sleeve and steering shaft.

As shown in FIG. 8, the upper steering shaft 3 has a knurling 26 in a fastening region 27, in which the ring magnet 11 or the ring magnet sleeve 110 are joined together by means of ultrasound welding. The knurling 26 is introduced into the upper shaft 3 from the surface. There may also be provided another geometry suitable for ultrasound welding, having small teeth or protrusions.

For the fastening of the ring magnet sleeve 110 and/or a stator holder 220 on the upper steering shaft 3, ultrasound waves are used as alternating mechanical vibrations (around 20 kHz) to place the metallic threaded part to be embedded (the steering shaft) in vibration via a sonotrode. Due to the resulting interface friction between metal and plastic at defined contact pressure, the plastic of the sleeve is heated at the contact surface and thereby becomes plastic, so that the steering shaft can become countersunk into the plastic sleeve under continuing pressure. The molten mass flows around the undercuts of the knurling 26 or the toothing of the upper steering shaft 3 and anchors them during the subsequent solidification process. The ring magnet sleeve 110 can be oriented axially and radially on the upper steering shaft 3.

Figure 9:
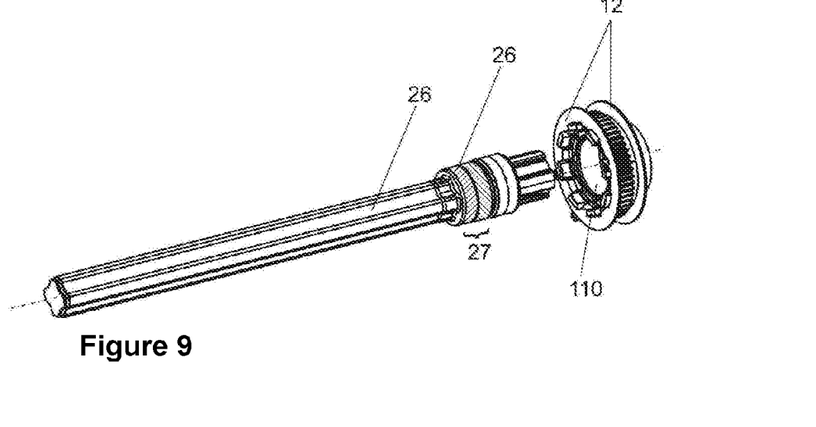
FIG. 9 is a perspective view of the steering shaft with ring magnet sleeve and magnetic flux guide.

The ring magnet sleeve 110 has protrusions 29 on its end face 28, which are provided for the fastening of a tool which secures the ring magnet sleeve 110 in order to prevent slippage under the sonic action.

Figure 10:
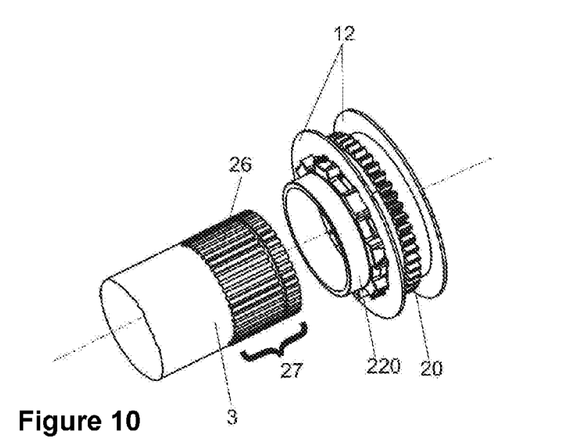
FIG. 10 is an exploded view of the magnetic flux guide with stator holder and the upper steering shaft.

FIG. 10 shows the upper steering shaft 3 and the one stator holder 220, which is surrounded by the first gear 20 with the outwardly directed first toothing 202 at the circumference. The stator holder is made of a thermoplastic material and formed as a single piece with the first gear 20. For the fastening of the stator holder 220 on the upper steering shaft 3, the plastic of the stator holder flows around the undercuts of the knurling 26 of the fastening region 27 of the upper steering shaft 3 by means of the ultrasound waves and during the subsequent solidification process it forms a form fit between stator holder and steering shaft 3.

Figure 11:
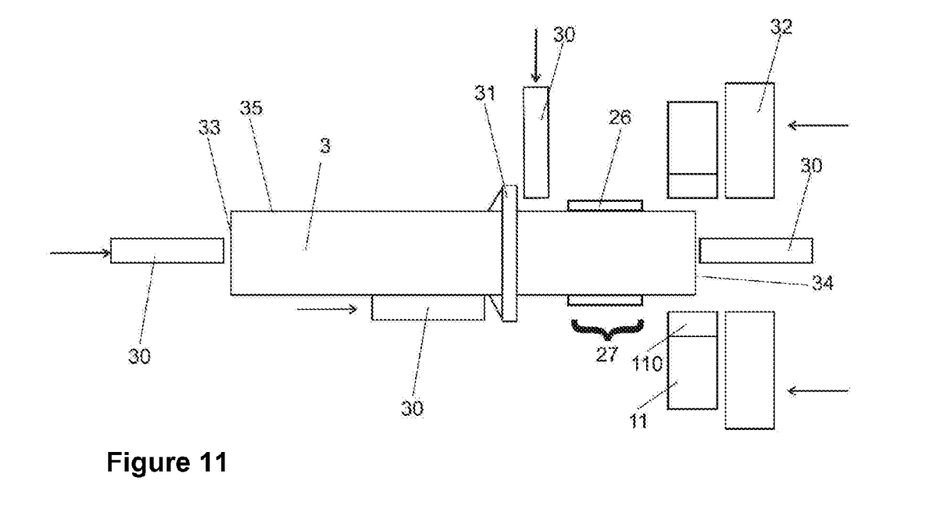
FIG. 11 is a schematic view of the method for fastening the ring magnet sleeve with possible positions of the sonotrode.

FIG. 11 illustrates the fastening of the ring magnet sleeve 110 on the upper steering shaft 3 by ultrasound forming. Four different variants are shown schematically to present how the steering shaft 3 can be joined to the magnet 11 by means of a sonotrode 30. The upper shaft 3 is held in position with a holding clamp 31. The ring magnet sleeve 110 is shoved onto the upper shaft 3 by the ring magnet 11, with the aid of a tool 32. The sonotrode 30 may be placed on one of the end faces 33, 34 of the steering shaft 3, 4. It is also possible to arrange the sonotrode 30 along the steering shaft 3, between the holding clamp 31 and the fastening region 27. The sonotrode 30 can also be used in parallel with the steering shaft 3 between the holding clamp 31 and the end 35 away from the fastening region.

The fastening of the ring magnet on the upper steering shaft by means of ultrasound forming enables a quick, clean and low-stress forming process. The use of a plastic sleeve is furthermore economical. Moreover, the press fitting process is not necessary and the injection molding tool for the production and the associated process are simplified (no inserting and positioning of the sleeve are needed).

What is claimed is:

1. An electromechanical power steering for a motor vehicle, comprising:
    a steering shaft which is rotatably mounted about a steering shaft axis of rotation, the steering shaft comprising:
        an upper steering shaft and a lower steering shaft; and
        a torsion bar joining the upper steering shaft and the lower steering shaft; and
    an integral component comprising a sensor unit comprising a torque sensor unit configured to detect rotation of the upper steering shaft relative to the lower steering shaft, and/or a steering angle sensor unit configured to measure the absolute steering angle of the lower steering shaft or the upper steering shaft with a spur gearing;
    wherein the sensor unit comprises a ring magnet rotationally fixed to the upper steering shaft or lower steering shaft, and
    wherein a magnetic sensor is configured to detect rotation of the steeling shaft connected to the ring magnet, and wherein the ring magnet is carried by a part in the shape of a ring magnet sleeve or a stator holder, the part being arranged on the upper steering shaft or the lower steering shaft; and
    wherein the ring magnet sleeve and/or the stator holder is made from a thermoplastic material and is molded by ultrasound forming in the steering shaft in one region for mounting on the steering shaft.

2. The electromechanical power steering of claim 1, wherein the upper steering shaft and/or the lower steering shaft comprises a knurling in a fastening region with the ring magnet sleeve and/or the stator holder.

3. The electromechanical power steering of claim 1, wherein the ring magnet sleeve comprises protrusions on one end face thereof configured to the fastening of a tool, which secures the ring magnet sleeve in order to prevent a slippage during the ultrasound forming.

4. The electromechanical power steering of claim 1, wherein a magnetic flux guide encloses the ring magnet sleeve.

5. The electromechanical power steering of claim 1, wherein the spur gearing comprises a first gear, which surrounds the ring magnet at a circumference with an outwardly directed first toothing, and a second gear, which is mounted able to turn about a second gear axis, having an outwardly directed second toothing encircling the second gear axis, wherein the second gear axis is situated parallel to and spaced apart from the steering shaft axis of rotation and the first toothing and the second toothing are intermeshed with each other.

6. The electromechanical power steering of claim 5, wherein the first gear with the outwardly directed first toothing is fashioned as a single piece with the stator holder.

7. The electromechanical power steering of claim 5, comprising a third gear, which is mounted able to turn about a third gear axis, having an outwardly directed third toothing encircling the third gear axis, wherein the third gear axis is situated parallel to and spaced apart from the steering shaft axis of rotation and parallel to and spaced apart from the second gear axis.

8. The electromechanical power steering of claim 7, comprising a magnetic substrate, which is joined rotationally fixed to the third gear or integrally forms the third gear, and its rotational position can be sensed by a sensor element.

9. The electromechanical power steering of claim 8, comprising a fourth gear, comprising an inwardly directed fourth toothing encircling the second gear axis and third gear axis, and meshing with the third toothing.

10. A method for mounting an integral component in an electromechanical power steering for a motor vehicle, comprising a steering shaft which is rotatably mounted about a steering shaft axis of rotation and which comprises an upper steering shaft and a lower steering shaft, which are joined together by a torsion bar, wherein the integral component has a sensor unit, comprising a torque sensor unit, which is configured to detect rotation of the upper steering shaft relative to the lower steering shaft, and/or a steering angle sensor unit, which measures the absolute steering angle of the lower steering shaft or the upper steering shaft with a spur gearing, wherein the sensor unit comprises a ring magnet rotationally fixed to the upper steering shaft or lower steering shaft, and wherein a magnetic sensor is configured to detect rotation of the steering shaft connected to the ring magnet, and wherein the ring magnet is carried by a part in the shape of a ring magnet sleeve or a stator holder, the part being arranged on the upper steering shaft or the lower steering shaft, the method comprising:
  providing the ring magnet sleeve and/or the stator holder made of a thermoplastic material;
  positioning the ring magnet sleeve and/or the stator holder on the upper steering shaft or the lower steering shaft with a selected contact pressure;
  introducing a high-frequency mechanical vibration in the ultrasound range into the corresponding steering shaft; and
  pressing the corresponding steering shaft into the ring magnet sleeve and/or the stator holder with a selected contact pressure.

11. The method of claim 10, wherein the high-frequency, mechanical vibration lies in a range of 10 kHz to 40 kHz.

12. The method of claim 10, wherein the upper steering shaft and/or the lower steering shaft, comprises a knurling on an outer side and in that the ring magnet sleeve and/or the stator holder plasticized by the high-frequency mechanical vibration flows around undercuts of the knurling, so that after the cooldown a form fitting and integrally bonded connection is produced between the ring magnet sleeve and the upper steering shaft or the lower steering shaft and/or between the stator holder and the upper steering shaft or the lower steering shaft.

13. The method of claim 10, comprising holding in position, with a holding clamp, the steering shaft during said introducing of the high-frequency mechanical vibration in the ultrasound range into the steering shaft.

14. The method of claim 10, comprising performing said positioning of the ring magnet sleeve on the steering shaft with a tool which is placed on protrusions at an end face of the ring magnet sleeve.

15. The method of claim 10, comprising placing a sonotrode on one end face of the upper steering shaft or an end face of the lower steering shaft for said introducing of the high-frequency mechanical vibration.

* * * * *